(12) United States Patent
Jeon et al.

(10) Patent No.: US 11,623,609 B2
(45) Date of Patent: Apr. 11, 2023

(54) METHOD AND APPARATUS WITH VEHICLE CONTROL

(71) Applicant: SAMSUNG ELECTRONICS CO., LTD., Suwon-si (KR)

(72) Inventors: Jinyong Jeon, Yongin-si (KR); Seung Tae Khang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 166 days.

(21) Appl. No.: 17/141,612

(22) Filed: Jan. 5, 2021

(65) Prior Publication Data

US 2021/0362673 A1    Nov. 25, 2021

(30) Foreign Application Priority Data

May 20, 2020  (KR) .......................... 10-2020-0060533

(51) Int. Cl.
| | | |
|---|---|---|
| *B60R 25/01* | (2013.01) | |
| *B60R 25/25* | (2013.01) | |
| *B60H 1/00* | (2006.01) | |
| *B60R 25/10* | (2013.01) | |
| *B60J 3/02* | (2006.01) | |
| *B60R 25/31* | (2013.01) | |

(52) U.S. Cl.
CPC ......... *B60R 25/01* (2013.01); *B60H 1/00742* (2013.01); *B60J 3/0204* (2013.01); *B60R 25/1004* (2013.01); *B60R 25/25* (2013.01); *B60R 25/31* (2013.01)

(58) Field of Classification Search
CPC ............ B60N 2/002; B60N 2002/0268; A01K 11/006; B60R 21/01538; B60R 21/015; B60R 16/037; B60R 22/105; B60R 22/10; B60R 25/25; B60R 25/255; B60R 25/31; B60H 1/00742; B60H 1/00785; B60H 1/00792; B60J 1/2016; B60J 1/2086; B60J 3/0204; G06V 20/59; G06V 20/593; G06V 20/597; G06V 20/80; G06V 40/20; G06V 40/23; G06V 40/10; G06V 40/15; G06V 40/18; G06V 40/16; G06V 40/155; G08B 21/22; G08B 21/24
USPC ....................................................... 348/148
See application file for complete search history.

(56) References Cited

U.S. PATENT DOCUMENTS

| | | |
|---|---|---|
| 5,482,314 A | 1/1996 | Corrado et al. |
| 6,412,813 B1 | 7/2002 | Breed et al. |
| 9,381,855 B1 * | 7/2016 | Arnold ................... G08B 21/22 |
| 10,196,036 B2 * | 2/2019 | Alderman .................. B60J 1/17 |

(Continued)

FOREIGN PATENT DOCUMENTS

| | | |
|---|---|---|
| CN | 105691342 A | 6/2016 |
| CN | 207225291 U | 4/2018 |

(Continued)

*Primary Examiner* — Nathnael Aynalem
(74) *Attorney, Agent, or Firm* — NSIP Law

(57) ABSTRACT

A processor-implemented vehicle controlling method includes: determining whether an object in a vehicle is a living object based on radio detection and ranging (radar) information received from a radar sensor; in response to a determination that the object is a living object, determining bioinformation of the object based on the radar information; and adjusting a temperature in the vehicle based on the bioinformation and temperature information received from a temperature sensor.

24 Claims, 7 Drawing Sheets

(56) References Cited

U.S. PATENT DOCUMENTS

| | | | |
|---|---|---|---|
| 11,385,344 B2* | 7/2022 | Peng | G01S 13/56 |
| 2003/0169162 A1 | 9/2003 | Hyman | |
| 2003/0209893 A1 | 11/2003 | Breed et al. | |
| 2006/0006713 A1 | 1/2006 | Patterson et al. | |
| 2006/0139159 A1 | 6/2006 | Lee et al. | |
| 2009/0277190 A1 | 11/2009 | Piette | |
| 2017/0116839 A1* | 4/2017 | Friedman | B60N 2/26 |
| 2017/0240111 A1 | 8/2017 | Appukutty et al. | |
| 2017/0282828 A1* | 10/2017 | Carenza | G01S 7/415 |
| 2018/0053397 A1* | 2/2018 | Kaur | G08B 21/24 |
| 2020/0118409 A1* | 4/2020 | Yang | A61B 5/1171 |
| 2021/0293948 A1* | 9/2021 | Peng | G01S 13/345 |

FOREIGN PATENT DOCUMENTS

| | | |
|---|---|---|
| JP | 2010-070060 A | 4/2010 |
| KR | 10-1999-0040142 A | 6/1999 |
| KR | 10-1792949 B1 | 11/2017 |
| KR | 10-2018-0110825 A | 10/2018 |
| KR | 10-2020-0018150 A | 2/2020 |

* cited by examiner

METHOD AND APPARATUS WITH VEHICLE CONTROL

CROSS-REFERENCE TO RELATED APPLICATIONS

This application claims the benefit under 35 USC § 119(a) of Korean Patent Application No. 10-2020-0060533 filed on May 20, 2020, in the Korean Intellectual Property Office, the entire disclosure of which is incorporated herein by reference for all purposes.

BACKGROUND

1. Field

The following description relates to a method and apparatus with vehicle control.

2. Description of Related Art

When a vehicle with closed doors and windows receives direct light in the summer, a temperature in the vehicle may increase to a dangerous degree. For example, when an external temperature is 37.8 degrees Celsius (°) and a vehicle is exposed to direct light, a temperature of a dashboard of the vehicle may increase to 69.4°, a temperature of a steering wheel of the vehicle may increase to 52.8°, a temperature of front seats of the vehicle may increase to 50.6°, and a temperature of back seats of the vehicle may increase to 46.7°. In such an example, a measurement result shows that a body temperature of a child being in a back seat increases up to a dangerous 39.1°. There are many accidents where infants or children lose their lives in vehicles when they are left in a vehicle in the summer. In fact, about 40 infants or children die from such accidents each year.

To prevent such accidents from occurring, various policies have been proposed. For example, there is a rule to prevent a child from being left in a vehicle, among various rules for operating school buses for children according to a manual "childcare services guidance 2018," established by the Ministry of Health and Welfare in Korea. According to this rule, a fellow passenger such as a childcare or daycare teacher is required to check whether children get on or off a school bus safely when the school bus arrives at a daycare center, a kindergarten, or a school, and inform a teacher in charge of such a situation. The teacher in charge is required to check again whether there is a child left in the bus, when there is a child absent without notice. In addition, a driver of the bus is required not to move to another place, but wait in the bus until the checking of the attendance is finished.

The manual includes various safety measures. However, it is merely a guideline and not compulsory, and thus people are not required to follow the guideline in actual situations. Moreover, the manual is applied only to people in a certain occupational category, and not to parents of infants and children.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented vehicle controlling method includes: determining whether an object in a vehicle is a living object based on radio detection and ranging (radar) information received from a radar sensor; in response to a determination that the object is a living object, determining bioinformation of the object based on the radar information; and adjusting a temperature in the vehicle based on the bioinformation and temperature information received from a temperature sensor.

The determining of whether the object is a living object may include: determining whether the object is in the vehicle based on the radar information; and in response to a determination that the object is in the vehicle, determining whether the object in the vehicle is the living object based on the radar information.

The determining of whether the object is a living object may include: determining movement information of the object based on the radar information; and in response to a value of the movement information being greater than or equal to a threshold value, determining the object to be a living object.

The determining of whether the object is a living object may include: in response to the value of the movement information being less than the threshold value, determining a vibration frequency of the object from the radar information using a Doppler effect; and in response to the vibration frequency matching a bio-profile, determining the object to be a living object.

The vibration frequency may include a respiratory frequency and a pulse frequency.

The determining of the movement information of the object may include recognizing portions of the object and determining either one or both a relative displacement and relative speed of the portions as the movement information, based on the radar information.

The bioinformation may include any one or any combination of a size of the object, a form of the object, a respiration frequency, and a pulse frequency of the object.

The adjusting of the temperature may include: determining a type of the object based on the bioinformation; and adjusting the temperature in the vehicle to match a temperature profile corresponding to the determined type of the object.

The type of the object may include any one of an adult, child, cat, and dog, and the bioinformation may include bioinformation of the any one of the adult, child, cat, and dog.

The temperature profile may include a predetermined normal temperature of the determined type of the object, and the adjusting of the temperature in the vehicle to match the temperature profile may include adjusting the temperature in the vehicle such that a difference between the normal temperature and the adjusted temperature in the vehicle is less than or equal to a threshold.

The temperature profile may include a predetermined normal temperature of the determined type of the object, and the adjusting of the temperature in the vehicle may include: selecting one or more devices among devices of the vehicle based on a difference between the normal temperature and the temperature in the vehicle; and adjusting the temperature in the vehicle by controlling the selected devices.

The adjusting of the temperature in the vehicle may include: adjusting the temperature in the vehicle by controlling a cooling device or a heating device of the vehicle.

The adjusting of the temperature in the vehicle may include: adjusting an amount of light transmitted to an inside of the vehicle by controlling a shading device of the vehicle.

The method may include: transmitting, to an outside of the vehicle, an alarm signal that notifies of a presence or absence of the object based on the bioinformation and the temperature information.

The method may include: unlocking a door lock of the vehicle based on the bioinformation and the temperature information.

A non-transitory computer-readable storage medium may store instructions that, when executed by a processor, configure the processor to perform the method.

In another general aspect, a vehicle controlling apparatus includes: a radio detection and ranging (radar) sensor configured to radiate a detection signal to an object in a vehicle and receive a reflected signal from the object, and generate radar information by processing the reflected signal; and one or more processors configured to determine whether the object in the vehicle is a living object based on the radar information, determine bioinformation of the object based on the radar information in response to the object being determined to be a living object, and adjust a temperature in the vehicle based on the bioinformation and temperature information received from a temperature sensor.

For the adjusting of the temperature, the one or more processors may be configured to: determine a type of the object based on the bioinformation; and adjust the temperature in the vehicle to match a temperature profile corresponding to the determined type of the object.

For the adjusting of the temperature, the one or more processors may be configured to: adjust the temperature in the vehicle by controlling a cooling device or a heating device of the vehicle.

For the adjusting of the temperature, the one or more processors may be configured to: adjust an amount of light transmitted to an inside of the vehicle by controlling a shading device of the vehicle.

The one or more processors may be configured to: transmit, to an outside of the vehicle, an alarm signal that notifies of a presence or absence of the object based on the bioinformation and the temperature information.

The one or more processors may be configured to: unlock a door lock of the vehicle based on the bioinformation and the temperature information.

The apparatus may be the vehicle, and the apparatus may include either one or both of a cooling device and a shading device, and for the adjusting of the temperature, the one or more processors may be configured to adjust the temperature using either one or both of the cooling device and the shading device.

The apparatus may include a memory storing instructions that, when executed by the one or more processors, configure the one or more processors to perform the determining of whether the object in the vehicle is the living object, the determining of the bioinformation of the object, and the adjusting of the temperature in the vehicle.

In another general aspect, a vehicle includes: a vehicle controlling apparatus comprising one or more processors, and a radio detection and ranging (radar) sensor; a cooling device; and a shading device, wherein the radar sensor is configured to radiate a detection signal to an object in the vehicle and receive a reflected signal from the object, and generate radar information by processing the received reflected signal, and the one or more processors may be configured to determine whether the object in the vehicle is a living object based on the radar information, determine bioinformation of the object based on the radar information in response to the object being determined to be a living object, and adjust a temperature in the vehicle using the cooling device or the shading device based on the bioinformation and temperature information received from a temperature sensor.

The apparatus may include a memory storing instructions that, when executed by the one or more processors, configure the one or more processors to perform the determining of whether the object in the vehicle is the living object, the determining of the bioinformation of the object, and the adjusting of the temperature in the vehicle.

Other features and aspects will be apparent from the following detailed description, the drawings, and the claims.

Figure 1:
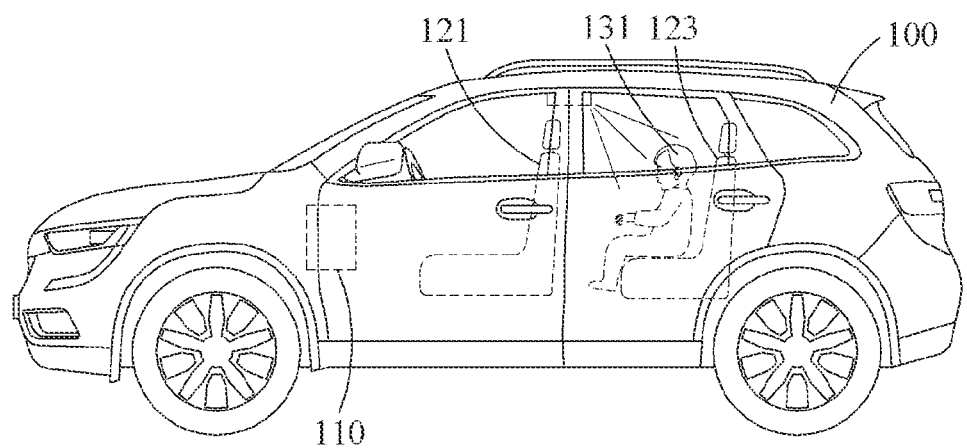
FIG. 1 illustrates an example of an operation of a vehicle controlling apparatus.

Throughout the drawings and the detailed description, unless otherwise described or provided, the same reference numerals refer to the same elements, features, and/or structures. The drawings may not be to scale, and the relative size, proportions, and depiction of elements in the drawings may be exaggerated for clarity, illustration, and/or convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Also, in the description of example embodiments, detailed description of structures or functions that are thereby known after an understanding of the disclosure of the present disclosure will be omitted when it is deemed that such description will cause ambiguous interpretation of the example embodiments.

Hereinafter, examples will be described in detail with reference to the accompanying drawings, and like reference numerals in the drawings refer to like elements throughout.

FIG. 1 illustrates an example of an operation of a vehicle controlling apparatus.

According to an example embodiment, a vehicle controlling apparatus 110 may control a vehicle 100 to determine whether there is a living object in the vehicle 100 and protect the living object in the vehicle 100 when it is determined that the living object is in the vehicle 100. The vehicle controlling apparatus 110 may control the vehicle 100 to protect the living object from a change in an internal temperature of the vehicle 100. The vehicle controlling apparatus 110 may protect the living object by controlling the vehicle 100 to prevent a body temperature of the living object from losing balance due to the change in the internal temperature of the vehicle 100. The living object described herein may include a human being and/or an animal, for example, infants, toddlers, children, pets, and the like, in particular. Hereinafter, an infant(s), a toddler(s), a preschooler(s), a child (children), and the like will be collectively referred to as a child (children).

The vehicle controlling apparatus 110 may automatically detect a child left in the vehicle 100, and perform a function to protect the child when the child is detected. The vehicle controlling apparatus 110 may determine an object left in the vehicle 100 using a radio detection and ranging (radar) sensor, determine whether the object is in a dangerous situation, and take a measure based on a result of the determining of whether the object is in the dangerous situation.

The vehicle controlling apparatus 110 may sequentially determine information associated with the object in the vehicle 100 using the radar sensor. First, when the vehicle 100 stops or a driver's seat of the vehicle 100 is empty, the vehicle controlling apparatus 110 may activate the radar sensor and the like. The vehicle controlling apparatus 110 may then determine whether there is an object in the vehicle 100 using the activated radar sensor. When there is an object in the vehicle 100, the vehicle controlling apparatus 110 may determine whether the object is a living object or a lifeless object.

In addition, the vehicle controlling apparatus 110 may reduce power consumption in various ways, thereby improving the technology fields of vehicle temperature control and safety and the functioning of vehicle controlling apparatuses. The vehicle controlling apparatus 110 may activate various devices including, for example, the radar sensor, for controlling the vehicle 100, when a driver of the vehicle 100 vacates the driver's seat. For example, when an engine of the vehicle 100 stops or the driver's seat is empty, the vehicle controlling apparatus 110 may activate the radar sensor and the like. However, when the driver is in the driver's seat, the vehicle controlling apparatus 110 may inactivate the radar sensor and the like to reduce power consumption.

In addition, when the vehicle controlling apparatus 110 determines that there is an object in the vehicle 100, the vehicle controlling apparatus 110 may determine whether the object is a living object or a lifeless object. When the vehicle controlling apparatus 110 determines that there is no object in the vehicle 100, the vehicle controlling apparatus 110 may inactivate the devices including the radar sensor for controlling the vehicle 100. Thus, the vehicle controlling apparatus 110 may reduce power consumption, thereby improving the technology fields of vehicle temperature control and safety and the functioning of vehicle controlling apparatuses.

The vehicle controlling apparatus 110 may determine detailed information associated with an object in the vehicle 100 using the radar sensor. The information associated with the object may include bioinformation of the object. The bioinformation may include bioinformation that is determined through an image analysis, for example, a size and shape of the object. The vehicle controlling apparatus 110 may further use an ultrasonic sensor, an infrared sensor, an image sensor, and a light detection and ranging (lidar) sensor, in addition to the radar sensor, to determine the size and shape of the object. Any of the ultrasonic sensor, infrared sensor, image sensor, and lidar sensor may be external to the vehicle controlling apparatus 110 or included in the vehicle controlling apparatus 110, according to examples.

The radar sensor used by the vehicle controlling apparatus 110 may radiate a transmission signal to a certain location in the vehicle 100 or in all directions in the vehicle 100. The location described in the foregoing may include a location of each seat in the vehicle 100. The location may be stored in advance in a memory. The radar sensor may radiate the transmission signal to the location through beamforming. The beamforming may also be referred to as beam focusing. The radar sensor may form a beam by applying analog beamforming or digital beamforming. The radar sensor may receive a reflected signal, which is reflected from the object. The reflected signal may be converted to radar information by being processed by the radar sensor or an external processor. The external processor described in the foregoing may be a processor included in the vehicle controlling apparatus 110. In a non-limiting example, the external processor may correspond to a processor 601 further described below with reference to FIG. 6.

The radar sensor may be included in the vehicle controlling apparatus 110, or installed outside the vehicle controlling apparatus 110. The radar sensor may be disposed in a center fascia disposed between the driver's seat and a front passenger seat of the vehicle 100, or a rearview mirror or a ceiling of the vehicle 100. However, such a position may be provided merely as an example, and thus the radar sensor may be disposed at various positions. In a non-limiting example, the radar sensor may correspond to a radar sensor 605 further described below with reference to FIG. 6.

The vehicle controlling apparatus 110 may determine an accurate location of a passenger by analyzing a reflected signal which is obtained by being reflected from the passenger, and may recognize an expression, a gesture, and/or a movement, of the passenger. The reflected signal that is reflected by the beamforming may have a resolution according to an angle. For example, when an angular resolution is three degrees (°) and a field of view (FoV) is 18×18, a 6×6 pixel size may be embodied. Such radar information may have a resolution, and thus enable the image analysis. Through this, the vehicle controlling apparatus 110 may determine the presence or absence of an object and determine whether an object in each seat is an adult, a child, or an animal, and recognize a movement or action, or a face of the object more accurately.

The bioinformation may also include information that is obtained (e.g., determined) through a frequency analysis, for example, a respiratory frequency or a pulse of the object, in addition to the bioinformation that is determined through the image analysis, for example, the size and shape of the object. However, these are provided merely as examples, and the bioinformation may include various sets of information indicating biological characteristics of the object. To that end, the vehicle controlling apparatus 110 may use various devices and/or sensors to obtain the bioinformation, in addition to the radar sensor. The vehicle controlling apparatus 110 may Compared to a typical vehicle controlling apparatus that may only use an ultrasonic sensor, an infrared sensor, an image sensor, or a lidar sensor, the vehicle controlling apparatus 110 of one or more embodiments may obtain information on which the frequency analysis is performed (for example, the respiratory frequency or the pulse of the object), by using the radar sensor. Using such various sets of information, the vehicle controlling apparatus 110 may more accurately determine a type of the object and a health condition of the object.

The vehicle controlling apparatus 110 may more accurately determine a risk level by more accurately determining the type and the health condition of the object. For example, the vehicle controlling apparatus 110 may classify the risk level into a plurality of levels based on the respiratory frequency or the pulse of the object. For example, the vehicle controlling apparatus 110 may classify the risk level into level 1, level 2, and level 3 in ascending order.

The vehicle controlling apparatus 110 may perform various operations to protect the object based on the risk level of the object. For example, when the risk level is classified as level 1, the vehicle controlling apparatus 110 may operate a cooling device and a shading device. When the risk level is classified as level 2, the vehicle controlling apparatus 110 may control the cooling device and the shading device and transmit an alarm signal to an outside of the vehicle 100. When the risk level is classified as level 3, the vehicle controlling apparatus 110 may unlock a door lock of the vehicle 100 and open windows of the vehicle 100, and transmit an alarm signal to the outside of the vehicle 100. The alarm signal described in the foregoing may include an audible signal that is generated by a horn, in addition to a communication signal that is transmitted to a terminal or a communication server. The shading device described herein may be a visor, or a sunscreen or a sunshade for a vehicle, for example.

Level 1 may refer to a predetermined detailed risk level at which a health condition of a child left in the vehicle 100 may be maintained safe through temperature adjustment, but the door lock is not unlocked to prevent a potential risk of kidnapping. Level 2 may refer to a predetermined detailed risk level at which the health condition of the child may be maintained temporarily safe through the temperature adjustment, but an immediate return of a guardian or protector of the child to the vehicle 100 is requested. Level 3 may refer to a predetermined detailed risk level at which the health condition of the child becomes abnormal, and a quick help is requested from passersby or pedestrians near the vehicle 100. The vehicle controlling apparatus 110 may perform an appropriate operation based on the detailed risk levels associated with the health condition of the object as described above, and thus may maintain a balance between the protection of the health condition of the child and the prevention of another potential risk, for example, a risk of kidnapping.

In an example, the vehicle controlling apparatus 110 may be included in the vehicle 100 along with the cooling device and the shading device. The vehicle 100 may radiate a detection signal to an object in the vehicle 100 using the radar sensor. The radar sensor may then receive a reflected signal which is reflected from the object. The reflected signal may be converted to radar information by being processed through the radar sensor or the processor external to the radar sensor.

The processor of the vehicle controlling apparatus 110 and/or the vehicle 100 may determine whether the object in the vehicle 100 is a living object based on the radar information. When the object is a living object, the processor may obtain bioinformation of the object based on the radar information. The bioinformation may include a size, a shape, and a respiratory frequency or a pulse frequency of the object. The processor may adjust a temperature in the vehicle 100 using the cooling device or the shading device based on the bioinformation and temperature information received from a temperature sensor. The temperature sensor may measure a temperature inside the vehicle (e.g., an ambient air temperature inside the vehicle), and may be external to the vehicle controlling apparatus 110 or included in the vehicle controlling apparatus 110, according to examples. The vehicle 100 may further include a heating device. When an internal temperature of the vehicle 100 is less than a threshold low temperature, the vehicle 100 may increase the internal temperature through the heating device.

Referring to FIG. 1, the vehicle 100 may include a plurality of seats 121 and 123. When the seat 121 (which is a driver's seat) is empty, the vehicle 100 may radiate a transmission signal to the remaining seat 123 using the radar sensor. The radiated transmission signal may be reflected from an object 131, and the radar sensor may receive a reflected signal therefrom. The radar sensor may generate radar information by processing the received reflected signal. The radar information may include bioinformation of the object 131.

The vehicle controlling apparatus 110 may determine a size, a shape, or a movement of the object 131 by analyzing the radar information, and determine whether the object 131 is a living object or a lifeless object. For example, when the object 131 moves while the vehicle 100 is standing still, the vehicle controlling apparatus 110 may determine the object 131 to be a living object.

The vehicle controlling apparatus 110 may determine a type of the object 131 based on the bioinformation. The vehicle controlling apparatus 110 may collect sets of information on the size, the shape, and the respiratory frequency or the pulse frequency of the object 131, and compare the collected sets of information to various types of bio-profiles stored in the memory. The vehicle controlling apparatus 110 may determine the object 131 to be a child based on a matching bio-profile. The vehicle controlling apparatus 110 may then retrieve, from the memory, a temperature profile corresponding to the child.

The vehicle controlling apparatus 110 may sense a temperature in the vehicle 100, and compare the sensed temperature to the temperature profile. When the temperature in the vehicle 100 is in a normal range of the temperature profile, the vehicle controlling apparatus 110 may inactivate the radar sensor and the like without taking any measures. However, when the temperature in the vehicle 100 is out of the normal range of the temperature profile, the vehicle controlling apparatus 110 may take various measures or perform various operations to protect the object 131, thereby improving the technology fields of vehicle temperature control and safety and the functioning of vehicle controlling apparatuses.

Figure 2:
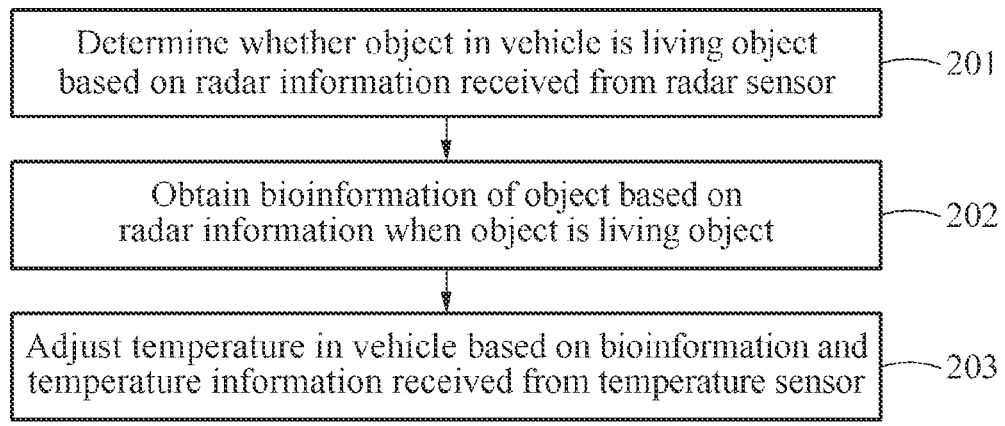
FIG. 2 illustrates an example of a vehicle controlling method.

FIG. 2 illustrates an example of a vehicle controlling method.

Before operation 201 to be described hereinafter, the vehicle controlling apparatus 110 may determine whether there is an adult or driver in a vehicle. For example, when there is a human being on a driver's seat of the vehicle or an engine of the vehicle starts, the vehicle controlling apparatus 110 may determine that there is an adult in the vehicle. The vehicle controlling apparatus 110 may determine whether there is a human being on the driver's seat using a pressure sensor included in the driver's seat of the vehicle. For example, the vehicle controlling apparatus 110 may determine there is the human being on the driver's seat when a pressure information from the pressure sensor is greater than or equal to a predetermined threshold. When a driver is determined to be in the vehicle, the vehicle controlling apparatus 110 may inactivate the radar sensor and the like, and thus reduce power consumption, thereby improving the technology fields of vehicle temperature control and safety and the functioning of vehicle controlling apparatuses. However, when the vehicle controlling apparatus 110 determines there is no human being on the driver's seat (e.g., when the pressure information is less than the predetermined threshold), the vehicle controlling apparatus 110 may determine there is no adult or driver in the vehicle and may perform operation 201. In another example, the vehicle controlling apparatus 110 may determine there is no adult or driver in the vehicle and may thus perform operation 201 when all pressure informations from pressure sensors included in seats of the vehicle are less than the predetermined threshold.

Referring to FIG. 2, in operation 201, the vehicle controlling apparatus 110 may determine whether an object in the vehicle is a living object based on radar information received from the radar sensor. The vehicle controlling apparatus 110 may first determine whether there is an object in the vehicle based on the radar information. When the object is not determined to be in the vehicle, the vehicle controlling apparatus 110 may inactivate the radar sensor and the like, and thus reduce power consumption of the vehicle controlling apparatus 110. When the object is determined to be in the vehicle, the vehicle controlling apparatus 110 may determine whether the object in the vehicle is a living object based on the radar information.

To determine whether the object is a living object, the vehicle controlling apparatus 110 may obtain movement information of the object based on the radar information. When the movement information indicates a value greater than or equal to a threshold value, the vehicle controlling apparatus 110 may determine the object to be a living object.

The vehicle controlling apparatus 110 may calculate relative movement information of each of portions included in the object, and determine the object to be a living object in response to the movement information indicating a value greater than or equal to the threshold value. For example, the vehicle controlling apparatus 110 may recognize a torso and a head of the object as the portions, and calculate a relative displacement and/or speed of the torso and the head. In this example, when the relative displacement or speed of the torso and the head is greater than or equal to a threshold value, the vehicle controlling apparatus 110 may determine the object to be a living object. In an example, the relative displacement or speed of the torso and the head may be a displacement or speed of the torso relative to the head, or of the head relative to the torso.

For example, the vehicle controlling apparatus 110 may determine whether the object is a living object based on relative movement information of the object with respect to the vehicle. For example, when the object moves in a vertical direction while the vehicle is moving only in (or substantially in) a horizontal direction without moving in the vertical direction, the vehicle controlling apparatus 110 may determine the object to be a living object.

When the movement information including the relative displacement or speed indicates a value less than the threshold value, the vehicle controlling apparatus 110 may obtain a vibration frequency of the object from the radar information using a Doppler effect. When the vibration frequency matches a bio-profile, the vehicle controlling apparatus 110 may determine the object to be a living object.

The vehicle controlling apparatus 110 may extract a respiratory frequency and/or a pulse frequency of the object from the radar information. The radar information may include a body displacement that occurs by respiration or pulses of the object. The vehicle controlling apparatus 110 may calculate a relative speed of a body of the object based on the body displacement, from the body displacement through the Doppler effect. The vehicle controlling apparatus 110 may calculate the respiratory frequency based on the relative speed. In addition, the vehicle controlling apparatus 110 may calculate the pulse frequency based on the radar information. The vehicle controlling apparatus 110 may compare the calculated frequencies to threshold values, and determine whether the object is a living object. For example, the vehicle controlling apparatus 110 may determine the object to be a living object when either one or both of the calculated frequencies is greater than or equal to a respective one of the threshold values.

In operation 202, when the object is a living object, the vehicle controlling apparatus 110 may obtain bioinformation of the object based on the radar information. Here, operations 202 and 201 may be performed simultaneously. Alternatively, operation 202 may be performed at a different time from operation 201. For example, the vehicle controlling apparatus 110 may determine whether the object is a living object by calculating the displacement or speed of the object in operation 201, and then calculate the respiratory frequency or the pulse frequency in operation 202.

In operation 203, the vehicle controlling apparatus 110 may adjust a temperature in the vehicle based on the bioinformation and temperature information received from a temperature sensor. The vehicle controlling apparatus 110 may determine a type of the object based on the bioinformation. The vehicle controlling apparatus 110 may determine the type of the object based on a size, a shape, and the respiratory frequency or the pulse frequency of the object.

The vehicle controlling apparatus 110 may adjust the temperature in the vehicle to match a temperature profile corresponding to the determined type of the object. For example, the vehicle controlling apparatus 110 may adjust the temperature in the vehicle such that (or until) a difference between a temperature of the temperature profile and the temperature in the vehicle is less than or equal to a predetermined threshold. A memory may store therein various temperature profiles corresponding to various types of living objects. A temperature profile described herein may include body temperature information about a body temperature when a health condition of a corresponding living object is normal. For example, the memory may store therein a normal temperature (or temperature range) of a child or a normal temperature of a dog. In an example, the normal temperatures are predetermined for the object.

The vehicle controlling apparatus 110 may determine whether the temperature in the vehicle is out of the temperature profile corresponding to the determined type of the object, or determine whether the respiratory frequency or the pulse frequency is out of the bio-profile. When this is out of the corresponding profile, the vehicle controlling apparatus 110 may adjust the temperature in the vehicle. For example, the vehicle controlling apparatus 110 may adjust the temperature in the vehicle by controlling a cooling device or a heating device of the vehicle. The vehicle controlling apparatus 110 may adjust the temperature in the vehicle by adjusting an amount of light to be transmitted to an inside of the vehicle by controlling a shading device of the vehicle. The vehicle controlling apparatus 110 may adjust the temperature in the vehicle by opening windows of the vehicle. Thus, the vehicle controlling apparatus 110 may maintain a health condition of the object, thereby improving the technology fields of vehicle temperature control and safety and the functioning of vehicle controlling apparatuses.

The vehicle controlling apparatus 110 may transmit, to an outside of the vehicle, an alarm signal that notifies the presence or absence of the object based on the bioinformation and the temperature information. For example, when the temperature in the vehicle is out of the temperature profile or the bioinformation is out of the bio-profile, the vehicle controlling apparatus 110 may transmit, to the phone number of a terminal stored in the memory, a communication signal that warns of a situation in which a child or a pet is left in the vehicle. As another example or additionally, the vehicle controlling apparatus 110 may transmit, to the outside of the vehicle, an audible signal such as a horn to attract attention from passersby or pedestrians near the vehicle.

The vehicle controlling apparatus 110 may unlock a door lock of the vehicle based on the bioinformation and the temperature information. When the temperature in the vehicle is out of the temperature profile or the bioinformation is out of the bio-profile, the vehicle controlling apparatus 110 may automatically unlock the door lock of the vehicle to allow a third person to enter the vehicle.

Figure 3A:
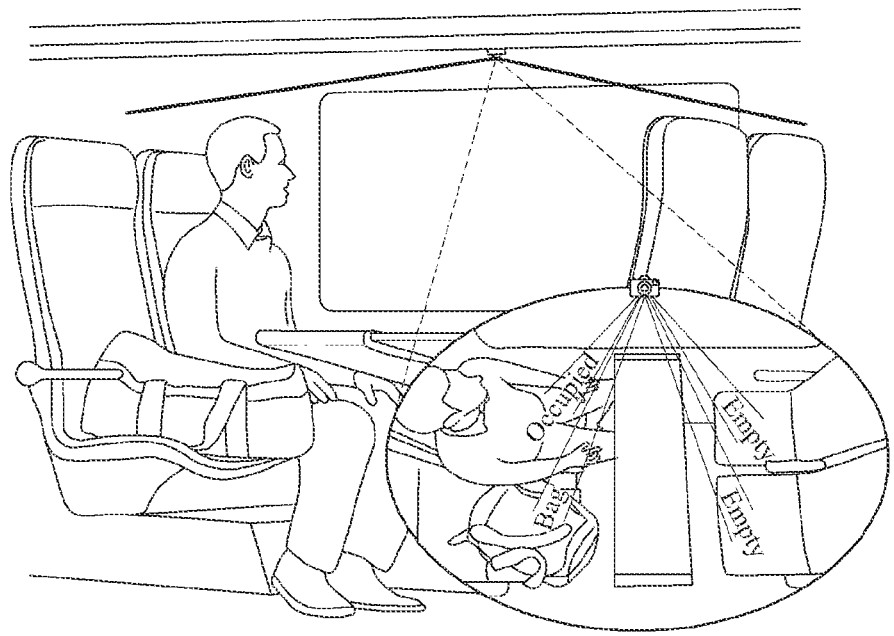
FIG. 3A illustrates an example of a characteristic of a radio detection and ranging (radar) sensor used by a vehicle controlling apparatus.
Figure 3B:
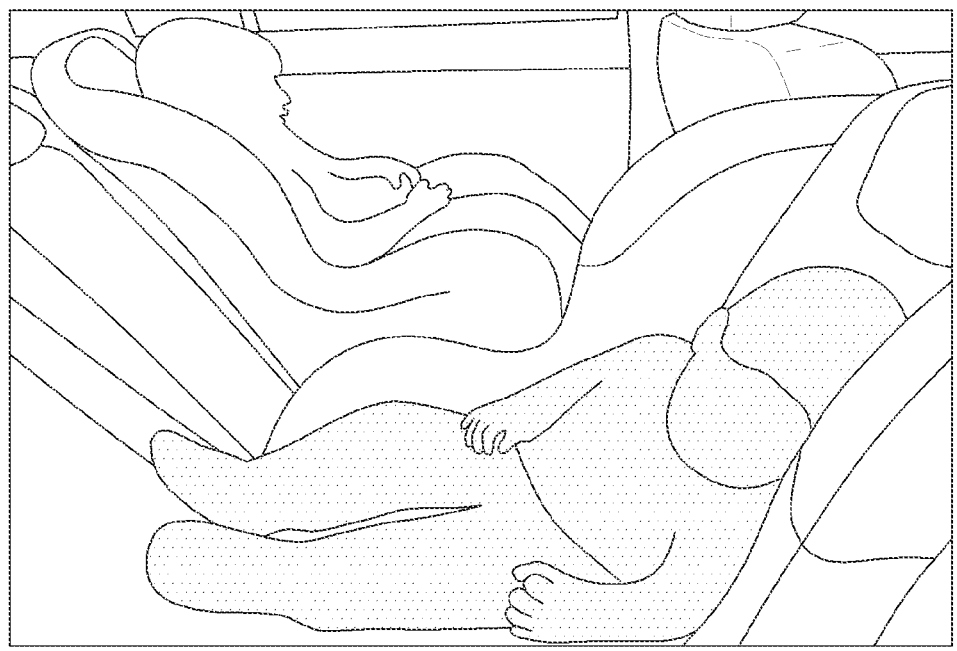
FIG. 3B illustrates an example of a characteristic of a radar sensor used by a vehicle controlling apparatus.

FIG. 3A illustrates an example of a characteristic of a radar sensor used by a vehicle controlling apparatus. FIG. 3B illustrates an example of a characteristic of a radar sensor used by a vehicle controlling apparatus.

A radar sensor may detect all seats included in a vehicle. For example, the radar sensor may be disposed on a ceiling of the vehicle. The radar sensor may have a field of view (FoV) of 360°. The radar sensor may have a preset measurable distance or range (for example, 1 meter (m)).

Referring to FIG. 3A, the radar sensor may be disposed on the ceiling of the vehicle and have a detection range of 360°. The radar sensor may radiate a transmission signal to each of the seats of the vehicle, and generate radar information from a reflected signal that is obtained as the transmission signal is reflected. For example, the vehicle controlling apparatus 110 may determine that two seats on a right side are empty and two seats on a left side are occupied by objects by analyzing the radar information. The vehicle controlling apparatus 110 may determine that an object on a front seat on the left side is not a living object and an object on a rear seat on the left side is a living object by analyzing the radar information. As described, by detecting all the seats in the vehicle using the single radar sensor, the vehicle controlling apparatus of one or more embodiments may reduce cost compared to a typical vehicle controlling apparatus using a plurality of radar sensors.

The radar sensor may not be affected by light, and thus be robust against weather or illumination. However, an inside of the vehicle may be affected by weather or illumination through windows. By an external illumination environment and internal illumination, there may be a dark portion in the vehicle. In addition, the backlight may be formed by direct light. The vehicle controlling apparatus of one or more embodiments may use the radar sensor may to more effectively detect the dark portion or a portion where the backlight is formed, compared to a typical vehicle controlling apparatus using an image sensor that is greatly affected by the lighting, thereby improving the technology fields of vehicle temperature control and safety and the functioning of vehicle controlling apparatuses by more effectively detecting children and/or infants where the backlight is formed.

Referring to FIG. 3B, two children are on different two seats in a vehicle. The two seats may have different illumination environments. A child at the back may be exposed to intense illumination, and a child at the front may be in a dark environment. The radar sensor may not be greatly affected by illumination, and thus may effectively detect the child at the front.

Figure 4:
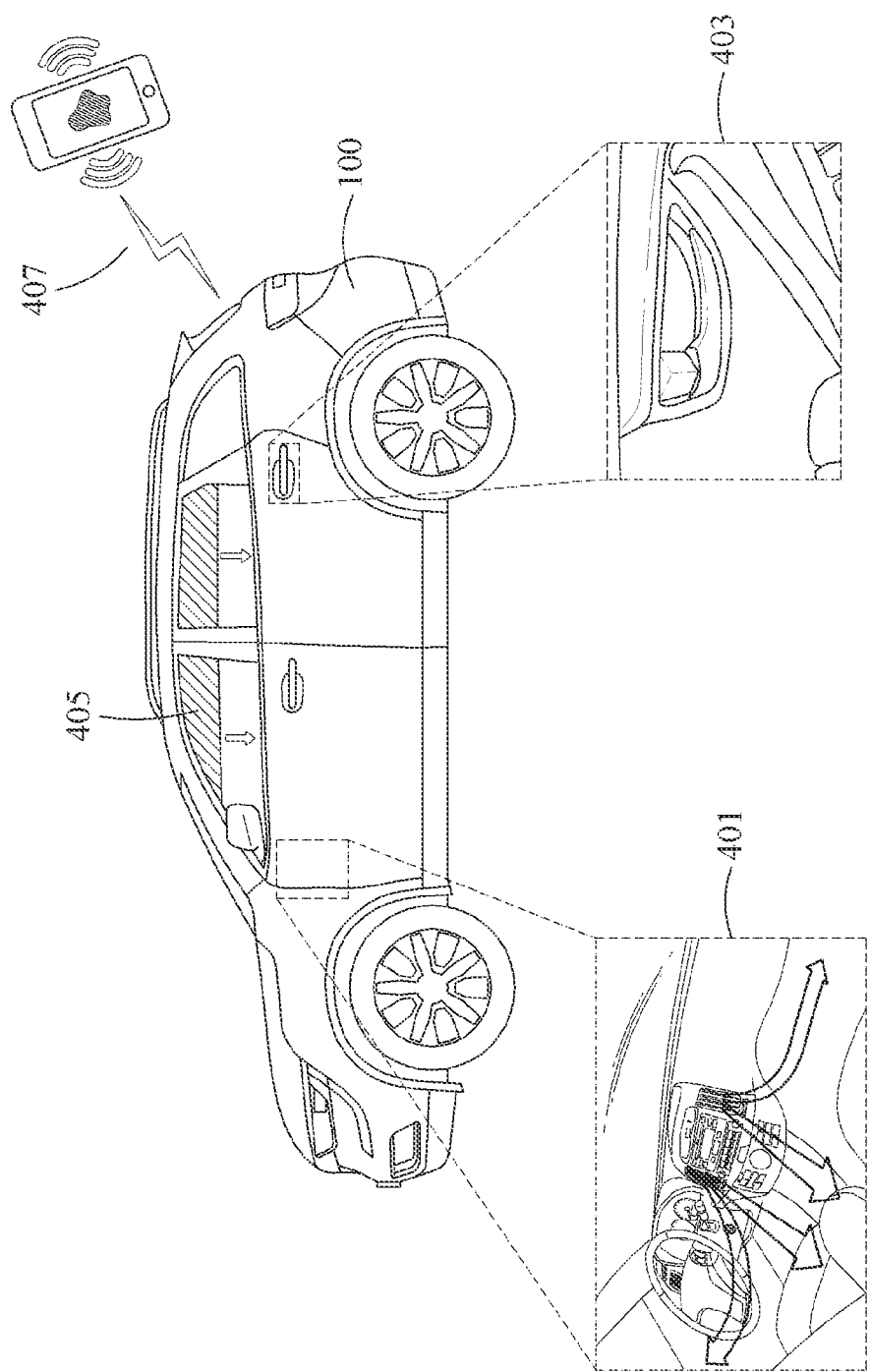
FIG. 4 illustrates an example of controlling various functions by a vehicle controlling apparatus.

FIG. 4 illustrates an example of controlling various functions by a vehicle controlling apparatus.

The vehicle controlling apparatus 110 may perform various operations to protect an object in response to a risk level the object faces. To this end, a vehicle 100 may include various components to protect the object. For example, as illustrated, the vehicle 100 may include a cooling and/or heating device 401. The vehicle 100 may include a door lock 403 configured to prevent a door from opening. The vehicle 100 may include a communicator 407 configured to communicate with an external server or terminal. The vehicle 100 may include a shading device 405 configured to adjust an amount of light to be transmitted through windows to the vehicle 100. Here, light transmittance of the shading device 405 may be set or varied. The shading device 405 may be of a simple shade type, or a filter type, for example.

The vehicle controlling apparatus 110 may selectively activate the components to protect the object in response to the risk level. For example, when a difference between an internal temperature of the vehicle 100 and a body temperature of a child (e.g., the normal temperature of the temperature profile of the child) left in the vehicle 100 is less than 3°, the vehicle controlling apparatus 110 may operate only the cooling device 401. When the difference is greater than or equal to 3° and less than 6°, the vehicle controlling apparatus 110 may operate the cooling device 401, the shading device 405, and the communicator 407. When the difference is greater than or equal to 6°, the vehicle controlling apparatus 110 may activate the cooling device 401, the shading device 405, and the communicator 407, and unlock the door lock 403. However, the door lock 403 may not be unlocked when the risk level is low to prevent a third person from unjustly trespassing into the vehicle 100. Accordingly, the vehicle controlling apparatus 110 may select which device or devices among the cooling device 401, the door lock 403, the shading device 405, and the communicator 407 to operate based on the difference between the internal temperature of the vehicle 100 and the body temperature of a child (e.g., the normal temperature of the temperature profile of the child).

Figure 5:
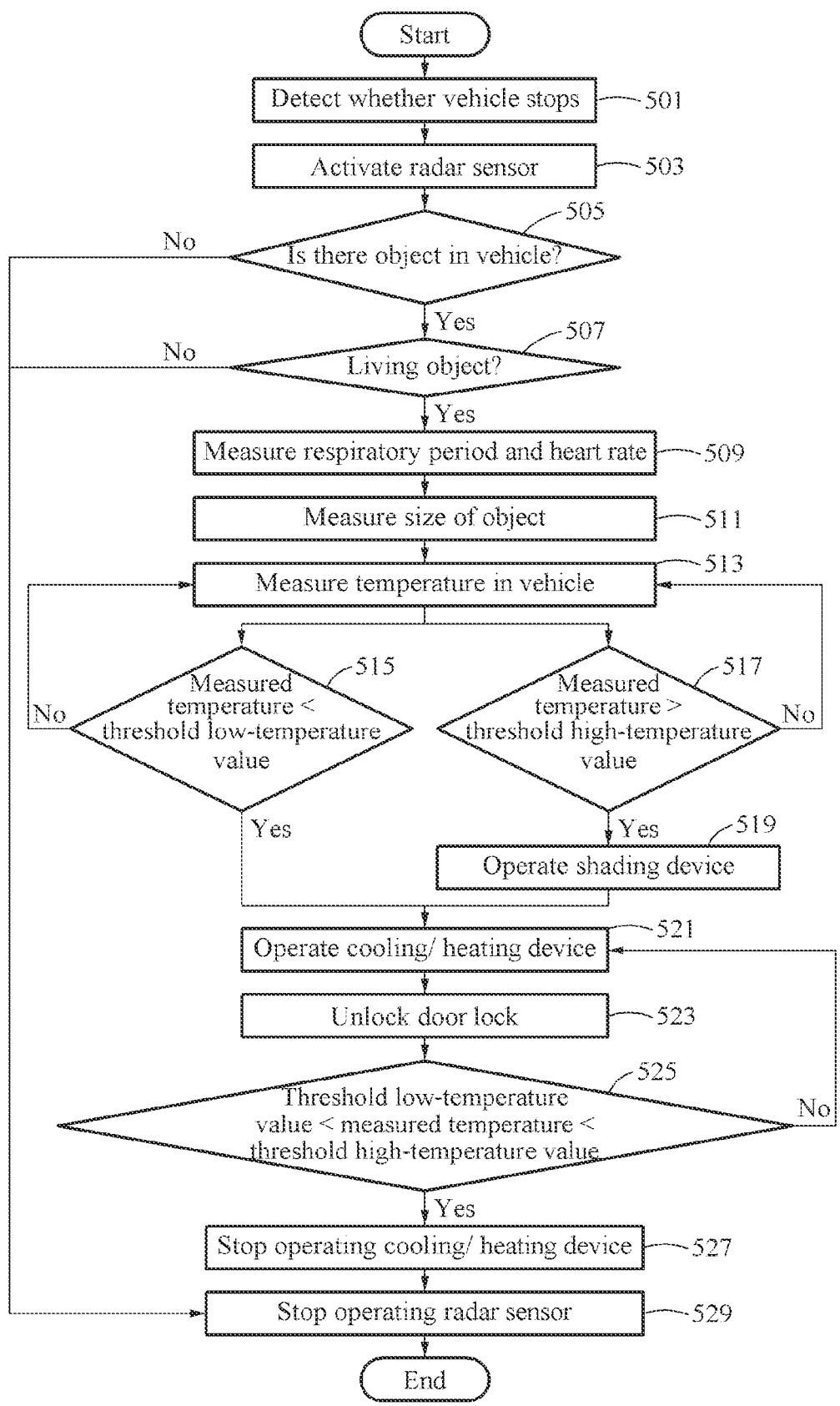
FIG. 5 illustrates an example of a vehicle controlling method.

FIG. 5 illustrates an example of a vehicle controlling method.

Referring to FIG. 5, in operation 501, the vehicle controlling apparatus 110 may detect that a vehicle stops. The vehicle controlling apparatus 110 may inactivate the radar sensor and others until the vehicle stops, thereby reducing power consumption.

In operation 503, the vehicle controlling apparatus 110 may activate the radar sensor. The vehicle controlling apparatus 110 may further activate an ultrasonic sensor, an infrared sensor, an image sensor, and/or a lidar sensor, in addition to the radar sensor.

In operation 505, the vehicle controlling apparatus 110 may detect whether there is an object in the vehicle. The vehicle controlling apparatus 110 may detect whether the object is on a seat in the vehicle. The vehicle controlling apparatus 110 may control the radar sensor to radiate a transmission signal to the seat. The vehicle controlling apparatus 110 may obtain radar information from the radar sensor, and determine whether the object is present in the vehicle by analyzing the obtained radar information. When there is no object in the vehicle, the vehicle controlling apparatus 110 may stop operating the radar sensor in operation 529.

In operation 507, when there is an object in the vehicle, the vehicle controlling apparatus 110 may detect a living object. The vehicle controlling apparatus 110 may determine whether the object is a living object by analyzing the radar information. When the object is determined not to be a living object, the vehicle controlling apparatus 110 may stop operating the radar sensor in operation 529. For example, the vehicle controlling apparatus 110 may perform an image analysis on the radar information and obtain a size and/or shape of the object. The vehicle controlling apparatus 110 may determine whether the object is a living object based on the size or shape of the object.

In operation 509, the vehicle controlling apparatus 110 measures a respiratory period or a heart rate based on the radar information. For example, the vehicle controlling apparatus 110 may perform a frequency analysis on the radar information and obtain a respiratory frequency or a pulse frequency of the object.

In operation 511, the vehicle controlling apparatus 110 measures the size of the object based on the radar information. Here, operations 507, 509, and 511 may be performed in a different order. For example, the vehicle controlling apparatus 110 may measure the respiratory frequency and the pulse frequency of the object and determine whether the object is a living object based on a result of the measuring.

The vehicle controlling apparatus 110 may determine a type of the object based on various sets of bioinformation of the object. The vehicle controlling apparatus 110 may collectively consider the size and the shape of the object and the respiratory frequency or the pulse frequency of the object, and compare them to various types of bio-profiles stored in a memory. For example, the vehicle controlling apparatus 110 may determine the object to be a child based on a matching bio-profile.

In operation 513, the vehicle controlling apparatus 110 may measure a temperature in the vehicle. The vehicle controlling apparatus 110 may retrieve, from the memory, a temperature profile corresponding to the determined type of the object. The vehicle controlling apparatus 110 may compare the measured temperature in the vehicle and the temperature profile.

In operation 515, the vehicle controlling apparatus 110 may compare the measured temperature to a threshold low temperature value of the temperature profile. In operation 521, when the measured temperature is less than the threshold low temperature value, the vehicle controlling apparatus 110 may operate a heating device. In operation 517, the vehicle controlling apparatus 110 may compare the measured temperature to a threshold high temperature value of the temperature profile. In operation 519, when the measured temperature is greater than the threshold high temperature value, the vehicle controlling apparatus 110 may operate a shading device. In operation 521, when the measured temperature is greater than the threshold high temperature value, the vehicle controlling apparatus 110 may operate a cooling device. In operation 523, the vehicle controlling apparatus 110 may additionally unlock a door lock. When the measured temperature is between the threshold low temperature value and the threshold high temperature value, the vehicle controlling apparatus 110 may continue monitoring a temperature in the vehicle.

In operation 525, the vehicle controlling apparatus 110 may detect again a temperature in the vehicle, and compare the detected temperature and the temperature profile. In operation 527, when the detected temperature is in a normal range, vehicle controlling apparatus 110 may stop operating the cooling device or the heating device. In operation 529, the vehicle controlling apparatus 110 may stop operating the radar sensor. When the detected temperature is out of the normal range, the vehicle controlling apparatus 110 may continue operating the cooling device or the heating device.

Figure 6:
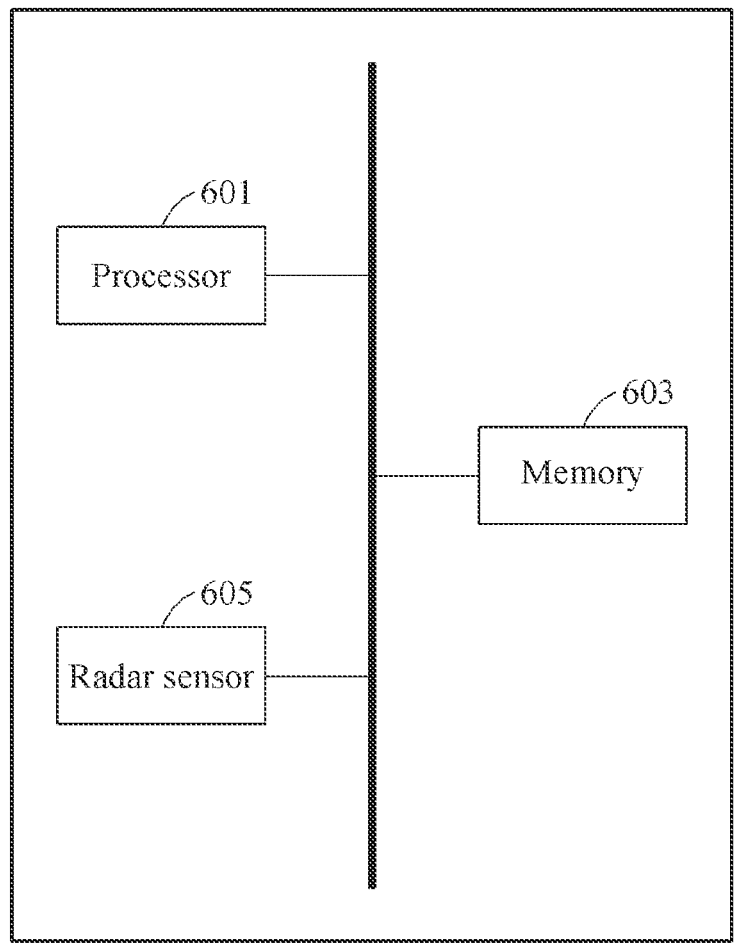
FIG. 6 illustrates an example of a vehicle controlling apparatus.

FIG. 6 illustrates an example of a vehicle controlling apparatus.

Referring to FIG. 6, the vehicle controlling apparatus 110 may include at least one processor 601 (e.g., one or more processors), a memory 603, and a radar sensor 605. The radar sensor 605 may radiate a detection signal to an object in a vehicle, receive a reflected signal from the object, and generate radar information by processing the received reflected signal.

The processor 601 may determine whether the object in the vehicle is a living object or not based on the radar information. When the object is a living object, the processor 601 may obtain bioinformation of the object based on the radar information from the radar sensor 605. The processor 601 may adjust a temperature in the vehicle based on the bioinformation and temperature information received from a temperature sensor.

The processor 601 may determine a type of the object based on the bioinformation. The processor 601 may adjust the temperature in the vehicle to match a temperature profile corresponding to the determined type of the object. For example, the processor 601 may adjust the temperature in the vehicle by controlling a cooling device or a heating device of the vehicle. For another example, the processor 601 may adjust an amount of light to be transmitted to an inside of the vehicle by controlling a shading device of the vehicle.

The processor 601 may transmit, to an outside of the vehicle, an alarm signal that notifies the presence or absence of the object based on the bioinformation and the temperature information. The alarm signal may include an audio signal, such as, for example, a horn, and a communication signal to be transmitted to a terminal of a guardian or protector. The communication signal may be transmitted to a terminal or a server of a stored address, and notify the guardian or protector of risk or danger.

The processor 601 may unlock a door lock of the vehicle based on the bioinformation and the temperature information. The unlocking of the door lock may allow a third person to trespass into the vehicle, and thus need to be performed as a last resort. An internal temperature of the vehicle may be monitored continuously, and the door lock may be locked again after the internal temperature of the vehicle returns to a normal range.

The vehicle controlling apparatus, vehicles, vehicle controlling apparatuses, cooling and/or heating devices, door locks, shading devices, communicators, processors, memories, radar sensors, ultrasonic sensors, infrared sensors, image sensors, lidar sensors, temperature sensors, servers, terminals, vehicle 100, vehicle controlling apparatus 110, cooling and/or heating device 401, door lock 403, shading device 405, communicator 407, processor 601, memory 603, radar sensor 605, and other apparatuses, devices, units, modules, and components described herein with respect to FIGS. 1-6 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A processor-implemented vehicle controlling method comprising:

determining whether an object in a vehicle is a living object based on radio detection and ranging (radar) information received from a radar sensor;
   in response to a determination that the object is a living object, determining bioinformation of the object based on the radar information; and
   determining a type of the object based on the bioinformation;
   determining a temperature profile corresponding to the determined type of the object from among various temperature profiles corresponding to various types of living objects; and
   adjusting a temperature in the vehicle to match the determined temperature profile, based on temperature information received from a temperature sensor.

2. The method of claim 1, wherein the determining of whether the object is a living object comprises:
   determining whether the object is in the vehicle based on the radar information; and
   in response to a determination that the object is in the vehicle, determining whether the object in the vehicle is the living object based on the radar information.

3. The method of claim 2, wherein the determining of whether the object is a living object comprises:
   determining movement information of the object based on the radar information; and
   in response to a value of the movement information being greater than or equal to a threshold value, determining the object to be a living object.

4. The method of claim 3, wherein the determining of whether the object is a living object comprises:
   in response to the value of the movement information being less than the threshold value, determining a vibration frequency of the object from the radar information using a Doppler effect; and
   in response to the vibration frequency matching a bio-profile, determining the object to be a living object.

5. The method of claim 4, wherein the vibration frequency comprises a respiratory frequency and a pulse frequency.

6. The method of claim 3, wherein the determining of the movement information of the object comprises recognizing portions of the object and determining either one or both a relative displacement and relative speed of the portions as the movement information, based on the radar information.

7. The method of claim 1, wherein the bioinformation comprises any one or any combination of a size of the object, a form of the object, a respiration frequency, and a pulse frequency of the object.

8. The method of claim 1, wherein the type of the object comprises any one of an adult, child, cat, and dog, and the bioinformation comprises bioinformation of the any one of the adult, child, cat, and dog.

9. The method of claim 1, wherein
   the determined temperature profile comprises a predetermined normal temperature of the determined type of the object, and
   the adjusting of the temperature in the vehicle to match the determined temperature profile comprises adjusting the temperature in the vehicle such that a difference between the normal temperature and the adjusted temperature in the vehicle is less than or equal to a threshold.

10. The method of claim 1, wherein
    the determined temperature profile comprises a predetermined normal temperature of the determined type of the object, and
    the adjusting of the temperature in the vehicle comprises:

selecting one or more devices among devices of the vehicle based on a difference between the normal temperature and the temperature in the vehicle; and adjusting the temperature in the vehicle by controlling the selected devices.

11. The method of claim 1, wherein the adjusting of the temperature in the vehicle comprises:

adjusting the temperature in the vehicle by controlling a cooling device or a heating device of the vehicle.

12. The method of claim 1, wherein the adjusting of the temperature in the vehicle comprises:

adjusting an amount of light transmitted to an inside of the vehicle by controlling a shading device of the vehicle.

13. The method of claim 1, further comprising:

transmitting, to an outside of the vehicle, an alarm signal that notifies of a presence or absence of the object based on the bioinformation and the temperature information.

14. The method of claim 1, further comprising:

unlocking a door lock of the vehicle based on the bioinformation and the temperature information.

15. A non-transitory computer-readable storage medium storing instructions that, when executed by a processor, configure the processor to perform the method of claim 1.

16. A vehicle controlling apparatus comprising:

a radio detection and ranging (radar) sensor configured to radiate a detection signal to an object in a vehicle and receive a reflected signal from the object, and generate radar information by processing the reflected signal; and one or more processors configured to determine whether the object in the vehicle is a living object based on the radar information, determine bioinformation of the object based on the radar information in response to the object being determined to be a living object, determine a type of the object based on the bioinformation, determine a temperature profile corresponding to the determined type of the object from among various temperature profiles corresponding to various types of living objects, and adjust a temperature in the vehicle to match the determined temperature profile based on temperature information received from a temperature sensor.

17. The apparatus of claim 16, wherein, for the adjusting of the temperature, the one or more processors are configured to:

adjust the temperature in the vehicle by controlling a cooling device or a heating device of the vehicle.

18. The apparatus of claim 16, wherein, for the adjusting of the temperature, the one or more processors are configured to:

adjust an amount of light transmitted to an inside of the vehicle by controlling a shading device of the vehicle.

19. The apparatus of claim 16, wherein the one or more processors are configured to:

transmit, to an outside of the vehicle, an alarm signal that notifies of a presence or absence of the object based on the bioinformation and the temperature information.

20. The apparatus of claim 16, wherein the one or more processors are configured to:

unlock a door lock of the vehicle based on the bioinformation and the temperature information.

21. The apparatus of claim 16, wherein the apparatus is the vehicle, the apparatus comprises either one or both of a cooling device and a shading device, and for the adjusting of the temperature, the one or more processors are configured to adjust the temperature using either one or both of the cooling device and the shading device.

22. The apparatus of claim 16, further comprising a memory storing instructions that, when executed by the one or more processors, configure the one or more processors to perform the determining of whether the object in the vehicle is the living object, the determining of the bioinformation of the object, and the adjusting of the temperature in the vehicle.

23. A vehicle comprising:

a vehicle controlling apparatus comprising one or more processors, and a radio detection and ranging (radar) sensor;

a cooling device; and a shading device, wherein the radar sensor is configured to radiate a detection signal to an object in the vehicle and receive a reflected signal from the object, and generate radar information by processing the received reflected signal, and the one or more processors are configured to determine whether the object in the vehicle is a living object based on the radar information, determine bioinformation of the object based on the radar information in response to the object being determined to be a living object, determine a type of the object based on the bioinformation, determine a temperature profile corresponding to the determined type of the object from among various temperature profiles corresponding to various types of living objects, and adjust a temperature in the vehicle to match the determined temperature profile using the cooling device or the shading device based on temperature information received from a temperature sensor.

24. The apparatus of claim 23 further comprising a memory storing instructions that, when executed by the one or more processors, configure the one or more processors to perform the determining of whether the object in the vehicle is the living object, the determining of the bioinformation of the object, and the adjusting of the temperature in the vehicle.

* * * * *